United States Patent
Seki (10) Patent No.: US 10,009,494 B2
(45) Date of Patent: Jun. 26, 2018

(54) IMAGE READING APPARATUS WITH END DETECTION AND IMAGE READING METHOD

(71) Applicant: CANON KABUSHIKI KAISHA, Tokyo (JP)

(72) Inventor: Hirotaka Seki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/334,086

(22) Filed: Oct. 25, 2016

(65) Prior Publication Data
US 2017/0126913 A1  May 4, 2017

(30) Foreign Application Priority Data
Nov. 4, 2015  (JP) ................. 2015-216641

(51) Int. Cl.
*G06K 15/00* (2006.01)
*H04N 1/00* (2006.01)
*H04N 1/40* (2006.01)

(52) U.S. Cl.
CPC ...... *H04N 1/00771* (2013.01); *H04N 1/0057* (2013.01); *H04N 1/00745* (2013.01);
(Continued)

(58) Field of Classification Search
CPC ............. H04N 1/0057; H04N 1/00681; H04N 1/00702; H04N 1/00745; H04N 1/00748;
(Continued)

(56) References Cited

U.S. PATENT DOCUMENTS 7,830,564 B2 * 11/2010 Harada ............... B41J 11/0095
                                                        358/443
8,018,629 B2    9/2011 Watanabe ................. 358/474
(Continued)

FOREIGN PATENT DOCUMENTS

JP    2013-115617    6/2013
JP    2013-123119    6/2013

OTHER PUBLICATIONS

U.S. Appl. No. 15/334,089, filed Oct. 25, 2016.
U.S. Appl. No. 15/334,078, filed Oct. 25, 2016.

*Primary Examiner* — Gabriel Garcia
(74) *Attorney, Agent, or Firm* — Fitzpatrick, Cella, Harper & Scinto (57) ABSTRACT

An image reading apparatus capable of recognizing edge portions of an original image with precision is provided. The image reading apparatus uses an image reading unit to scan an original being conveyed and read an image of the original. The image reading apparatus includes an edge information obtaining unit and an edge determining unit. The edge information obtaining unit detects an image of an edge portion of the original image and obtains, for each point in a main scanning direction, edge information, which indicates whether or not an edge portion image is detected at the point in a sub-scanning direction. The edge determining unit conducts detection from at least one of two directions of the main scanning direction to detect a point where a given number of successive edge portion images are detected, and obtains an edge portion based on the detected point.

16 Claims, 6 Drawing Sheets (52) U.S. Cl.
CPC ..... *H04N 1/00748* (2013.01); *H04N 1/00801* (2013.01); *H04N 2201/0094* (2013.01)

(58) Field of Classification Search
CPC ........... H04N 1/00771; H04N 1/00774; H04N 1/00801; H04N 1/3873; H04N 1/3877; H04N 2201/0094
USPC .................... 358/1.1–1.18, 448; 382/290
See application file for complete search history.

(56) References Cited

U.S. PATENT DOCUMENTS

| | | | |
|---|---|---|---|
| 8,174,737 B2 | 5/2012 | Kato et al. | 358/474 |
| 8,284,463 B2 | 10/2012 | Kato et al. | 358/488 |
| 8,295,642 B2 * | 10/2012 | Yoshizawa | H04N 1/00681 358/488 |
| 8,477,390 B2 | 7/2013 | Iwayama | 358/488 |
| 8,599,450 B2 * | 12/2013 | Kubo | G03G 15/60 271/258.03 |
| 9,197,775 B2 * | 11/2015 | Koda | H04N 1/0079 |
| 9,363,399 B2 * | 6/2016 | Mabara | H04N 1/00745 |
| 2009/0185240 A1 | 7/2009 | Kato et al. | 358/474 |

\* cited by examiner

IMAGE READING APPARATUS WITH END DETECTION AND IMAGE READING METHOD

BACKGROUND OF THE INVENTION

Field of the Invention

The present invention relates to an image reading apparatus, e.g., a scanner, which is configured to read an image (hereinafter referred to as "original image") of an original.

Description of the Related Art

An image reading apparatus is provided to an image forming apparatus, e.g., a copier or a multifunction apparatus, and is used to read an original image in copying or facsimile transmission. Moreover, the image reading apparatus may be connected to an information processing apparatus, e.g., a personal computer, and be used as a scanner. The image reading apparatus may include an original conveying apparatus, e.g., an automatic document feeder (ADF). The image reading apparatus including the original conveying apparatus is configured to continuously take in originals from the original conveying apparatus one by one, and to continuously read original images efficiently while conveying the taken-in originals. The image reading apparatus can efficiently read the original images by continuously taking in the originals from the original conveying apparatus.

To read an original image, the image reading apparatus irradiates an original being conveyed with light, and receives reflected light from the original. The image reading apparatus converts the received reflected light into an electric signal to generate image data representing the read original image. The image reading apparatus reads the original image by irradiating the original with light assuming that a direction perpendicular to a conveying direction of the original is a main scanning direction. When the original is conveyed with inclination with respect to the main scanning direction, the image reading apparatus reads the original image in an inclined state. In order to correct the inclination of the original image, there is proposed a technology for detecting an inclination amount of an original being conveyed to perform inclination correction.

In Japanese Patent Application Laid-open No. 2013-123119, there is proposed an image reading apparatus capable of detecting, with precision, edge portions of an original image that are used in the detection of the inclination amount of the original image. The image reading apparatus of Japanese Patent Application Laid-open No. 2013-123119 is configured to detect the inclination amount of an original image by reading an image of a wider area than the original and inferring the area of the original image from the result of the reading, based on the size of the original and on the result of detecting the edge portions of the read image.

In the case where specks, smudges, and the like are adhered to the background portion of an image reading apparatus which is outside the area of an original at a point where an original image is read, the image reading apparatus erroneously reads the specks, smudges, and the like in the background portion as an image (hereinafter referred to as "speck image"). The image reading apparatus conducting original image edge portion detection from a read image that contains a speck image may mistake the speck image for an edge portion of the original image. Misidentification of the original image edge portion hinders the accurate detection of the inclination amount of the original image. This problem is addressed by an image reading apparatus of U.S. Pat. No. 8,018,629 in which a speck image is regarded as an image with no density changes, and the determination of an original edge is controlled so as to exclude a spot where the speck image is located from the determination.

Reading of an image of an original that is being conveyed generally creates a considerable amount of paper dust. Paper dust moves around due to static electricity and air currents, and therefore forms floating specks instead of being fixed in one place. The density of a speck image in which floating specks are read is inconstant unlike a speck image of fixed specks. In addition, a speck image of floating specks may move location. It is therefore difficult for the related art to exclude a speck image of floating specks from the edge portion determination, which leads to the chance of erroneously detecting a speck image of floating specks as an edge portion.

SUMMARY OF THE INVENTION

An image reading apparatus according to the present disclosure includes a tray on which an original is to be placed; a conveyor configured to convey the original placed on the tray; an image reading unit configured to read an image of the original that is being conveyed by the conveyor to output image data; an edge information obtaining unit configured to detect an edge from image data of a plurality of lines near a front end of the original, and to obtain, for each point in a main scanning direction, edge information, which indicates whether or not an image of an edge portion is detected at the each point, the main scanning direction being orthogonal to a conveying direction in which the original is conveyed; and an original end portion detector configured to detect, based on the edge information, a main scanning point where a given number of successive edge portion images are detected in the main scanning direction, to thereby detect at least one end portion of the original in the main scanning direction in the image data.

Further features of the present invention will become apparent from the following description of exemplary embodiments (with reference to the attached drawings).

DESCRIPTION OF THE EMBODIMENTS

Now, an embodiment of the present invention is described with reference to the accompanying drawings.

Figure 1:
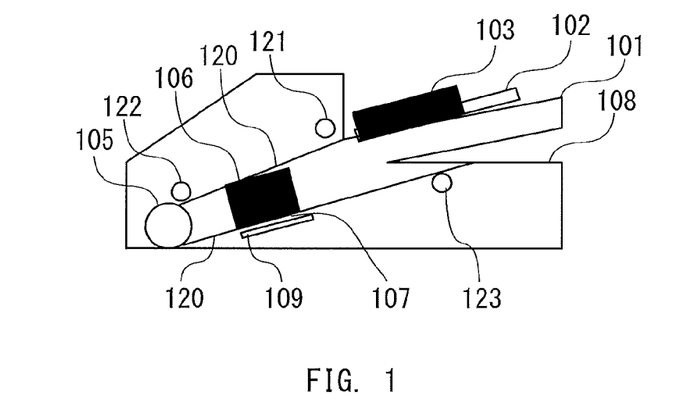
FIG. 1 is a block diagram of an image reading apparatus.

FIG. 1 is a block diagram of an image reading apparatus provided with an original conveying mechanism. The image reading apparatus includes an original tray 101, an original conveying motor 105, an image reading unit 106, and a delivery tray 108. On the original tray 101, one or more rectangular originals 102 are placed. A sheet feeding roller 121, a conveying roller 122, and a delivery roller 123 are provided along a conveyance route 120 of the original 102.

The sheet feeding roller 121, the conveying roller 122, and the delivery roller 123 are driven by the original conveying motor 105.

The original tray 101 is provided with two original guides 103 arranged side by side in a direction perpendicular to a conveying direction of the original 102. In this specification, the direction perpendicular to the conveying direction of the original 102 is referred to as "width direction of the original 102". The two original guides 103 are slidable in the width direction of the original 102, and are configured to sandwich the original 102 placed on the original tray 101 for registration. The sheet feeding roller 121 is configured to take in the originals 102 placed on the original tray 101 one by one. The conveying roller 122 is configured to convey the original 102 taken in by the sheet feeding roller 121 to the image reading unit 106. An original background plate 109 is provided in a position opposed to the image reading unit 106 across the conveyance route 120. The image reading unit 106 forms an image reading position 107 between the image reading unit 106 and the original background plate 109. The image reading unit 106 is configured to read an original image when the original 102 conveyed by the conveying roller 122 passes through the image reading position 107. The original 102 having the original image read is delivered from the image reading position 107 onto the delivery tray 108 by the delivery roller 123.

Figure 2:
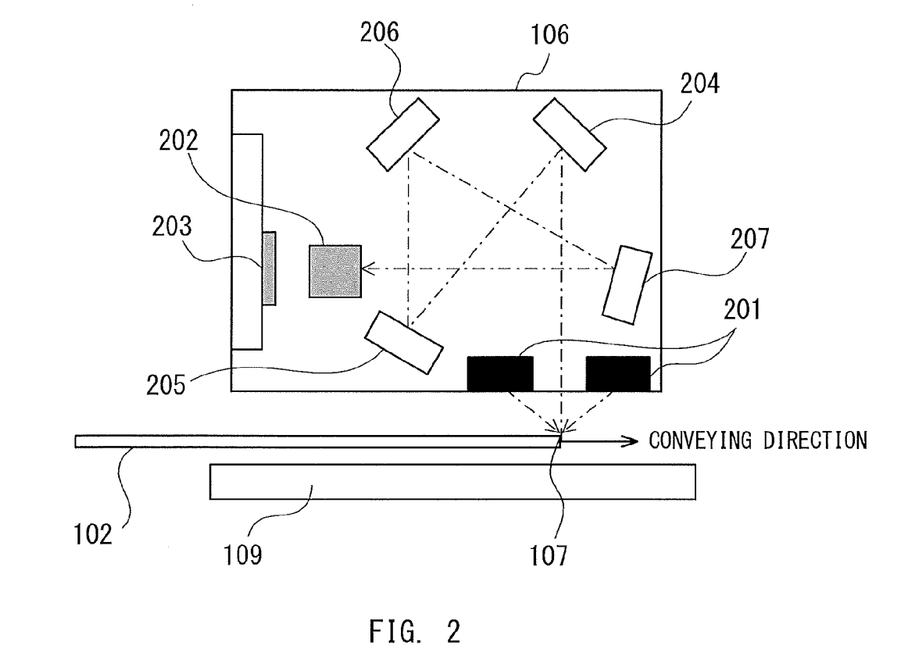
FIG. 2 is a block diagram of an image reading unit.

FIG. 2 is a block diagram of the image reading unit 106. The image reading unit 106 includes a light emitting diode (LED) light source 201, a lens 202, a charge coupled device (CCD) line sensor 203, and mirrors 204 to 207.

The LED light source 201 is configured to apply light to the original 102 passing through the image reading position 107. The LED light source 201 may be built from a plurality of LED elements (light-emitting elements) arranged side by side along the width direction of the original 102. Alternatively, the LED light source 201 may be configured to be movable in the width direction. Thus, the main scanning direction of the image reading unit 106 corresponds to the width direction of the original 102. A sub-scanning direction corresponds to the conveying direction of the original 102.

The light applied to the original 102 by the LED light source 201 is reflected by the original 102. The light reflected by the original 102 is reflected by the mirrors 204 to 207, and is guided to the lens 202. The lens 202 is configured to condense the reflected light on a light-receiving surface of the CCD line sensor 203. The CCD line sensor 203 has a light-receiving surface having a line shape and extending in the main scanning direction. The CCD line sensor 203 is configured to receive the reflected light condensed on the light-receiving surface and to photoelectrically convert the reflected light to generate analog image data being an electric signal representing the original image.

Figure 3:
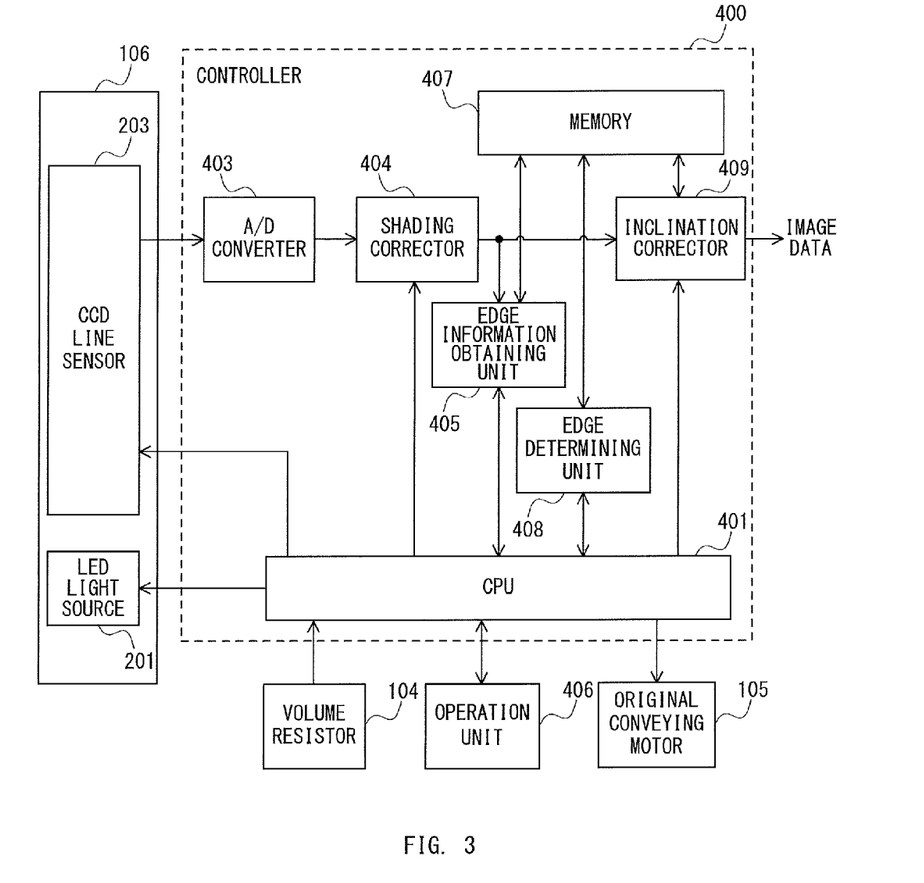
FIG. 3 is a block diagram of a controller.

FIG. 3 is a block diagram of a controller configured to control an operation of the image reading apparatus. A controller 400 is built into the image reading apparatus. The controller 400 includes a central processing unit (CPU) 401, an A/D converter 403, a shading corrector 404, an edge information obtaining unit 405, a memory 407, an edge determining unit 408, and an inclination corrector 409. The controller 400 is connected to the original conveying motor 105 and the image reading unit 106 (the LED light source 201 and the CCD line sensor 203) to exert control under which the original 102 is conveyed by the original conveying motor 105, and control under which the image reading unit 106 reads an image. The controller 400 acquires the analog image data representing the original image from the CCD line sensor 203, performs image processing, for example, inclination correction, and generates image data. The generated image data is used for copying, facsimile transmission, or transmission to a personal computer or the like. The components of the controller 400 are built from, for example, application-specific integrated circuits (ASICs), system-on-a-chip (SOC) processors, or other similar processors.

The controller 400 is connected to a volume resistor 104, and is configured to detect the resistance value of the volume resistor 104. The volume resistor 104 varies in resistance value depending on the gap between two original guides 103. The controller 400 can detect the gap between the two original guides 103 from the resistance value of the volume resistor 104. From the gap between the two guides 103, the controller 400 detects an original width that is the size in the width direction of the original 102 placed on the original tray 101.

The controller 400 is connected to an operation unit 406. The operation unit 406 includes an input device. Further, the operation unit 406 is configured to receive an instruction to start image reading processing or an instruction to specify an original size, which is issued by a user, and to transmit the instruction to the controller 400. The operation unit 406 includes an output device, such as a display. Further, The operation unit 406 is configured to display a message or the like under control of the controller 400.

The CPU 401 is configured to perform the image reading processing by controlling operations of the respective components of the image reading apparatus. In the image reading processing, the CPU 401 performs light emission control of the LED light source 201, the conveyance control of the original 102 by the original conveying motor 105, photoelectric conversion of the received reflected light by the CCD line sensor 203, and other control. The CPU 401 performs the image reading processing based on the user's instruction input through the operation unit 406. The CPU 401 is also configured to detect the original width of the original 102 placed on the original tray 101 based on the resistance value of the volume resistor 104.

The A/D converter 403 is configured to convert the analog image data input from the CCD line sensor 203 into digital image data. The shading corrector 404 is configured to perform image processing on the digital image data to correct nonuniformity of a light amount of the LED light source 201 and an influence of a pixel sensitivity of the CCD line sensor 203 (shading correction).

The edge information obtaining unit 405 is configured to detect the amount of inclination (slant) of the original 102 with respect to the main scanning direction (width direction), based on the digital image data corrected by the shading corrector 404. The edge information obtaining unit 405 inputs the detected inclination amount to the CPU 401. The edge information obtaining unit 405 is also configured to detect edge information, which indicates edge portions of the original image, based on the digital image data corrected by the shading corrector 404, and to store the edge information in the memory 407. The edge information obtaining unit 405 may obtain the digital image data from the memory 407 other than obtaining directly from the shading corrector 404. Details of the edge information obtaining unit 405 are described later.

The edge determining unit 408 inputs an edge portion of an original image in the main scanning direction (width direction) to the CPU 401 as an original end portion start point. The edge determining unit 408 is configured to determine an edge portion of an original image by obtaining the edge information, which is generated in the edge information obtaining unit 405, from the memory 407, based on an original edge determination value, which is a threshold for determining an edge portion of an original image and which is specified by the CPU 401.

The inclination corrector 409 is configured to store the digital image data corrected by the shading corrector 404 in the memory 407, and to perform the inclination correction on the digital image data based on the inclination amount specified by the CPU 401 to generate the image data. The inclination corrector 409 outputs the generated image data.

Figure 4:
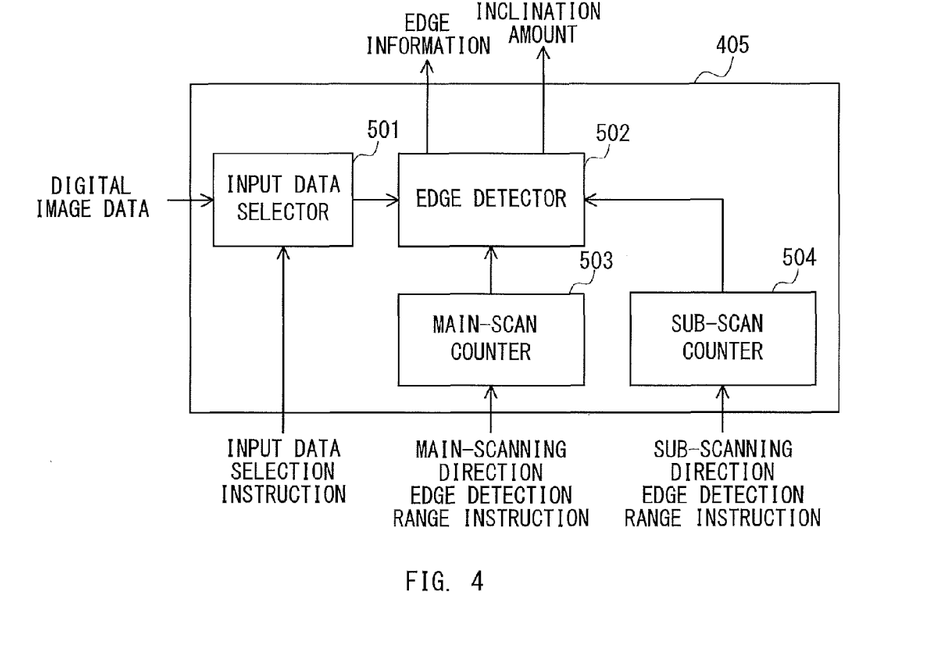
FIG. 4 is a block diagram for illustrating the detailed configuration of an edge information obtaining unit.

FIG. 4 is a block diagram for illustrating the detailed configuration of the edge information obtaining unit 405. The edge information obtaining unit 405 includes an input data selector 501, an edge detector 502, a main-scan counter 503, and a sub-scan counter 504. The components of the edge information obtaining unit 405 are built from, for example, application-specific integrated circuits (ASICs), system-on-a-chip (SOC) processors, or other similar processors.

The input data selector 501 is configured to transmit, to the edge detector 502, digital image data that is obtained from at least one of the shading corrector 404 and the memory 407, based on an input data selection instruction from the CPU 401. The edge detector 502 is configured to detect an edge image, which indicates an edge portion of an original image, by performing edge detecting processing on the digital image data obtained from the input data selector 501. The main-scan counter 503 is configured to control the range of edge detection by the edge detector 502 in the main scanning direction (width direction), based on a main scanning direction (width direction) edge detection range that is set by the CPU 401. The sub-scan counter 504 is configured to control the range of edge detection by the edge detector 502 in the sub-scanning direction, based on a sub-scanning direction (conveying direction) edge detection range that is set by the CPU 401.

The edge detector 502 detects an edge portion of the original image within the edge detection ranges set by the main-scan counter 503 and the sub-scan counter 504. The edge detector 502 stores edge information that indicates the detected edge portion in the memory 407. The edge detector 502 uses first-order differentiation, second-order differentiation, Hough transform, or other known methods to execute the detection of an original image edge.

Figure 5A:
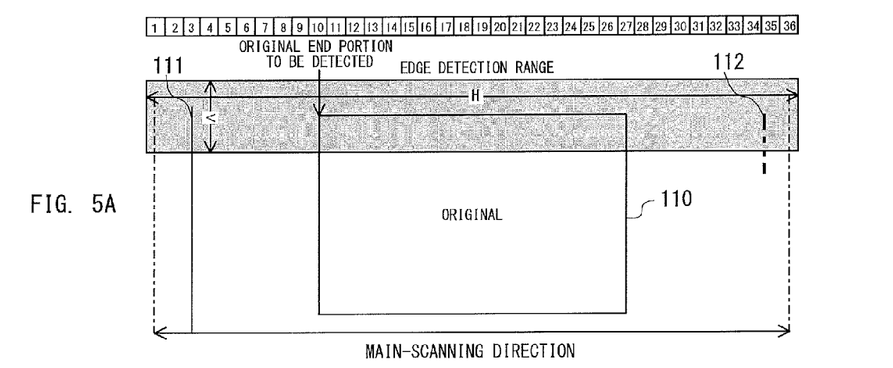
FIG. 5A, FIG. 5B, FIG. 5C, and FIG. 5D are explanatory diagrams of edge detecting processing and original end portion start point detecting processing.

FIG. 5A to FIG. 5D are explanatory diagrams of edge detecting processing and processing of detecting an original end portion start point. In FIG. 5A to FIG. 5D, the left-right direction is the main scanning direction (width direction), and the top-bottom direction is the sub-scanning direction (conveying direction). A pixel at the left end of the drawings is treated as the first pixel and a pixel at the right end of the drawings is treated as the thirty-sixth pixel for the purpose of description. FIG. 5A is an explanatory diagram of the range of detection of the original image edge. In this embodiment, an edge detection range H in the main scanning direction which is set in the main-scan counter 503 measures thirty-six pixels, and an edge detection range V in the sub-scanning direction which is set in the sub-scan counter 504 measures four pixels. Setting the size of the edge detection range V to four pixels enables the edge detector 502 to detect edge portions of an original image even when the original 102 is slanted. The edge detection range V is set to suit the state in which the original 102 is conveyed. The edge detection range V is set to a range that measures given pixels (a given plurality of lines) from a point preceding the front end of the original 102 in the original conveying direction. In short, edge detection is performed on image data near the front end of the original.

An original image represented by digital image data contains a fixed speck image 111, which is caused by fixed specks and is indicated by the straight line in the drawing, and a floating speck image 112, which is caused by floating specks and is indicated by the broken line in the drawing, in an edge image 110, which indicates edge portions to be detected.

Figure 5B:
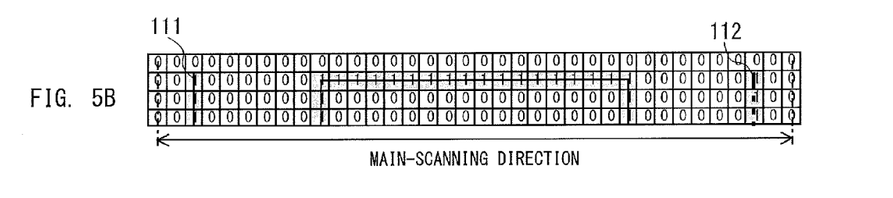
Figures 5C, 5D:
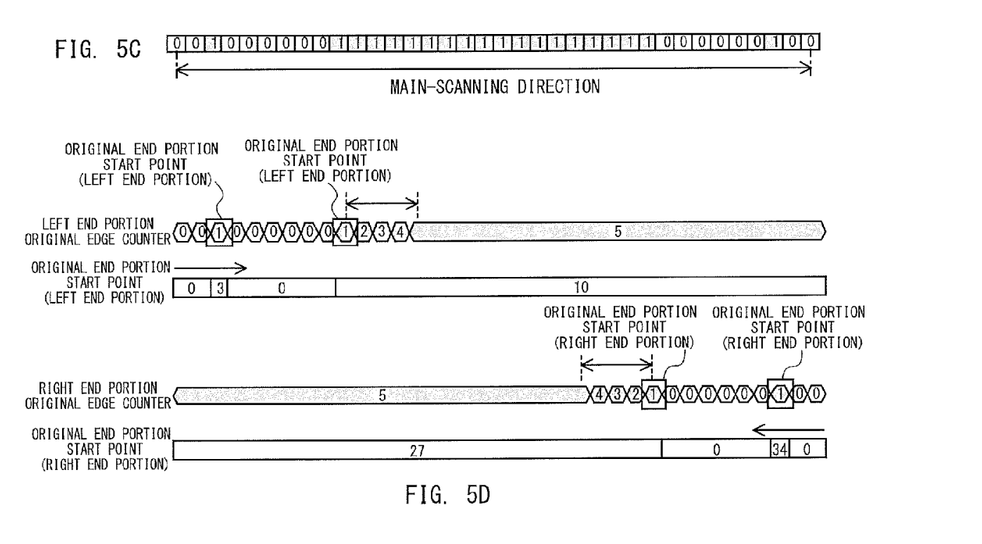

The edge detector 502 conducts edge detection within the edge detection ranges H and V first to obtain a detection result of FIG. 5B. The edge detector 502 detects, for example, pixels where the color changes from the background color as an edge portion. The edge detector 502 digitizes the detection result by assigning "1" to a pixel that is detected as a part of an edge portion and "0" to a pixel that is not detected as a part of an edge portion. The fixed speck image 111 and the floating speck image 112 are detected as edge portions, and pixels in the fixed speck image 111 and the floating speck image 112 are accordingly assigned "1". Based on this detection result, the edge detector 502 performs logical addition in the sub-scanning direction for each point (each pixel) in the main scanning direction, and obtains, for each pixel in the main scanning direction, a calculation result that assigns "1" to a pixel for which the edge image is detected even once and "0" to a pixel for which an edge is detected not even once. The edge detector 502 next obtains, for each main scanning point, the logical sum of the edge detection results of a plurality of sub-scanning points. The results of the logical addition in the sub-scanning direction are illustrated in FIG. 5C. The logical addition results indicate, for each point in the main scanning direction, whether or not the edge image is detected at the point. The edge detector 502 stores the logical addition results as edge information in the memory 407. In this embodiment, the third and thirty-fourth pixels from the right in the drawing in the main scanning direction are detected as parts of edge portions as a result of the logical addition, due to the fixed speck image 111 and the floating speck image 112. In this manner, the edge detector 502 generates from digital image data the edge information, an example of which is illustrated in FIG. 5C.

The edge determining unit 408 obtains from the memory 407 the edge information generated by the edge detector 502, such as the one in FIG. 5C, and executes processing of detecting an original end portion start point based on the obtained edge information. FIG. 5D is an explanatory diagram of the original end portion start point detecting processing. The edge determining unit 408 checks the edge information one pixel by one pixel from both directions of the main scanning direction to detect two end portions of the edge image 110 in the main scanning direction. In this embodiment, by checking the edge information from both directions of the main scanning direction at the same time, the edge determining unit 408 detects the left end portion and right end portion of the edge image 110. Alternatively, the edge determining unit 408 may detect at least one end portion of the edge image 110 as an edge portion. The edge determining unit 408 in this case checks the edge information one pixel by one pixel from one direction of the main scanning direction.

In the case where a given number of successive pixels are set to a value "1" in the edge information, the edge determining unit 408 determines the pixel at the head of the successive pixels as an edge portion. The given number for successive pixels that have a value "1" is five in this embodiment. The given number for successive pixels is set as the original edge determination value in the edge determining unit 408 by the CPU 401. The edge determining unit 408 includes a left end portion original edge counter and a right end portion original edge counter (not shown) to count how many successive pixels have a value "1". The edge determining unit 408 latches the location of a pixel that is set to a value "1" as an original end portion start point. When a pixel that has a value "0" is detected, the edge determining unit 408 clears the count of the relevant counter to "0" and clears the original end portion start point as well.

In the example of FIG. 5D, where the third pixel has a value "1", the edge determining unit 408 latches the third pixel as an original end portion start point and sets the count of the left end portion original edge counter to "1". However, the fourth pixel has a value "0". The edge determining unit 408 accordingly clears the latched original end portion start point and clears the count of the left end portion original edge counter to "0".

The tenth pixel has a value "1". The edge determining unit 408 therefore latches the tenth pixel as an original end portion start point and sets the count of the left end portion original edge counter to "1". The following successive pixels up through the twenty-seventh pixel have a value "1". Because the number of successive pixels that is used as the original edge determination value is five in this embodiment, the edge determining unit 408 determines the pixel at the latched original end portion start point as the edge location of the left end portion of the original image after the value of the fourteenth pixel is checked.

The edge location of the right end portion of the original image is determined as follows. In the example of FIG. 5D, where the thirty-fourth pixel has a value "1", the edge determining unit 408 latches the thirty-fourth pixel as an original end portion start point and sets the count of the right end portion original edge counter to "1". However, the thirty-third pixel has a value "0". The edge determining unit 408 accordingly clears the latched original end portion start point and clears the count of the right end portion original edge counter to "0".

The twenty-seventh pixel has a value "1". The edge determining unit 408 therefore latches the twenty-seventh pixel as an original end portion start point and sets the count of the right end portion original edge counter to "1". The following successive pixels up through the tenth pixel have a value "1". Because the number of successive pixels that is used as the original edge determination value is five in this embodiment, the edge determining unit 408 determines the pixel at the latched original end portion start point as the edge location of the right end portion of the original image after the value of the twenty-third pixel is checked.

In the manner described above, when a specified number of successive pixels that is specified by the CPU 401 are set to a value "1" in the edge information, the edge determining unit 408 determines the pixel at the head of the successive pixels as an edge portion of a read original image, not a vertical streak caused by specks. The edge determining unit 408 determines the tenth pixel as the original start point at the left end and the twenty-seventh pixel as the original start point at the right end, and transmits the result of determining the original start points at the left end and the right end to the CPU 401.

The edge information obtaining unit 405 obtains the original start points at the left end and the right end from the CPU 401, identifies an image within this range as the edge image 110 effective for the calculation of the inclination amount, and calculates the inclination amount of the original 102. The inclination amount is calculated by the edge detector 502 of the edge information obtaining unit 405 by calculating a straight line running through two points that form an edge portion on the front side in the conveying direction of the edge image 110 of the original image which is obtained as a result of the edge detection, within the range of the original start points at the left end and the right end. The edge detector 502 outputs the calculated inclination amount to the CPU 401. The inclination amount of the original 102 can thus be calculated at a reduced chance of misidentification of an edge portion due to a speck image.

Figure 6:
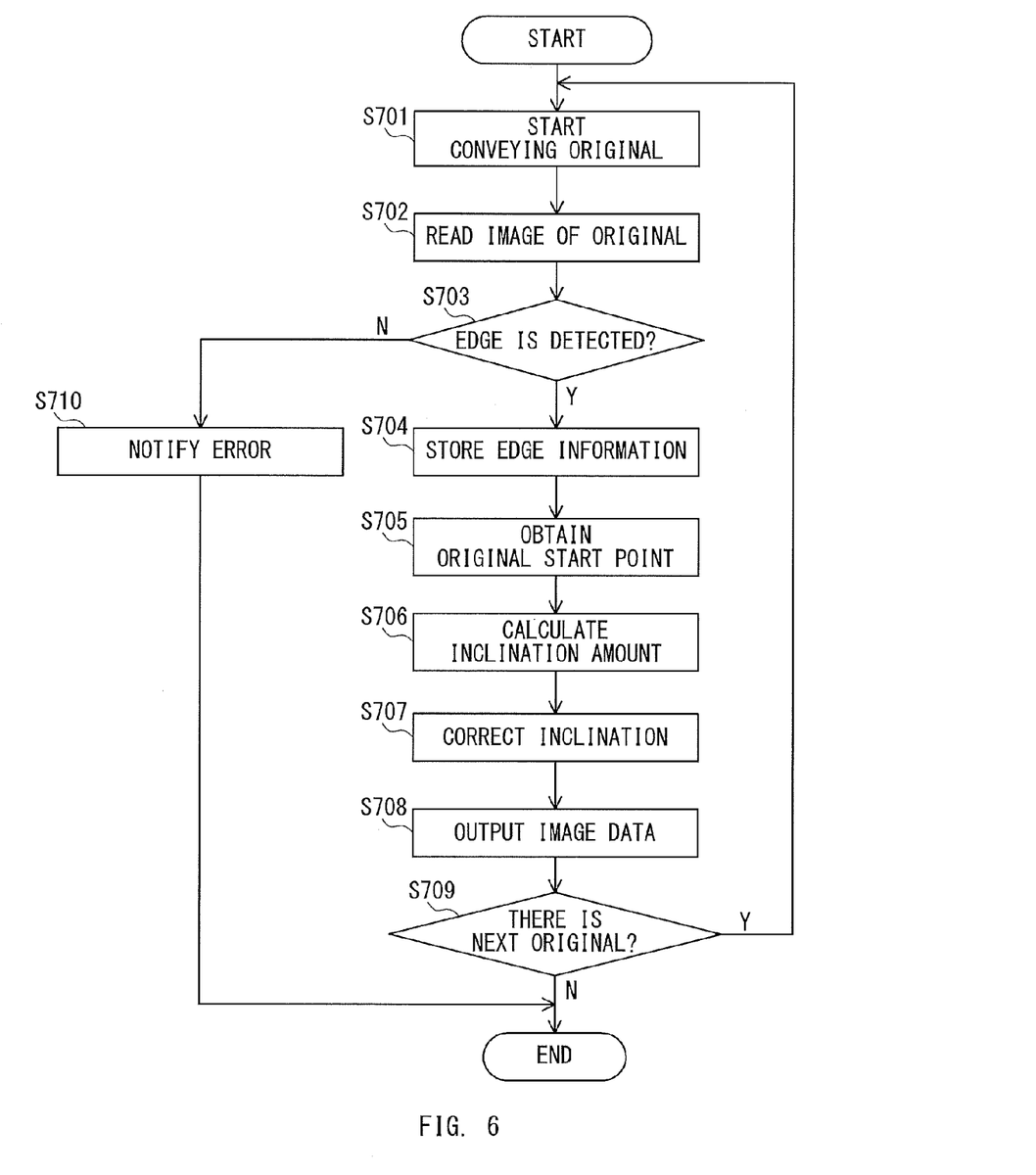
FIG. 6 is a flowchart of image reading processing.

FIG. 6 is a flowchart of image reading processing that is executed by the image reading apparatus configured in the manner described above. The image reading apparatus starts processing of reading an original image in response to an instruction to start image reading processing that is issued by the user through the operation unit 406.

The controller 400 receives the instruction to start image reading processing from the operation unit 406 and starts conveying the original 102 with the use of the original conveying motor 105 (Step S701). The image reading unit 106 reads an original image while the original 102 is being conveyed by the sheet feeding roller 121 and the conveying roller 122 from the original tray 101 to the image reading position 107 (Step S702). The image reading unit 106 inputs analog image data that represents the read original image to the controller 400. The delivery roller 123 delivers the original 102 having the original image read from the image reading position 107 onto the delivery tray 108.

The controller 400 uses the A/D converter 403 and the shading corrector 404 to generate digital image data by converting the analog image data obtained from the image reading unit 106 into digital data and then performing shading correction on the digital data. The edge information obtaining unit 405 of the controller 400 uses the edge detector 502 to detect an edge from the image data (Step S703). In the case where an edge is successfully detected (Step S703: Y), the edge detector 502 generates the edge information, an example of which is illustrated in FIG. 5C, and stores the edge information in the memory 407 (Step S704). In the case where the edge detector 502 is unsuccessful in detecting an edge (Step S703: N), the controller 400 determines that an error has occurred in the image reading apparatus, and notifies the error through the output device of the operation unit 406 (Step S710).

Figure 7:
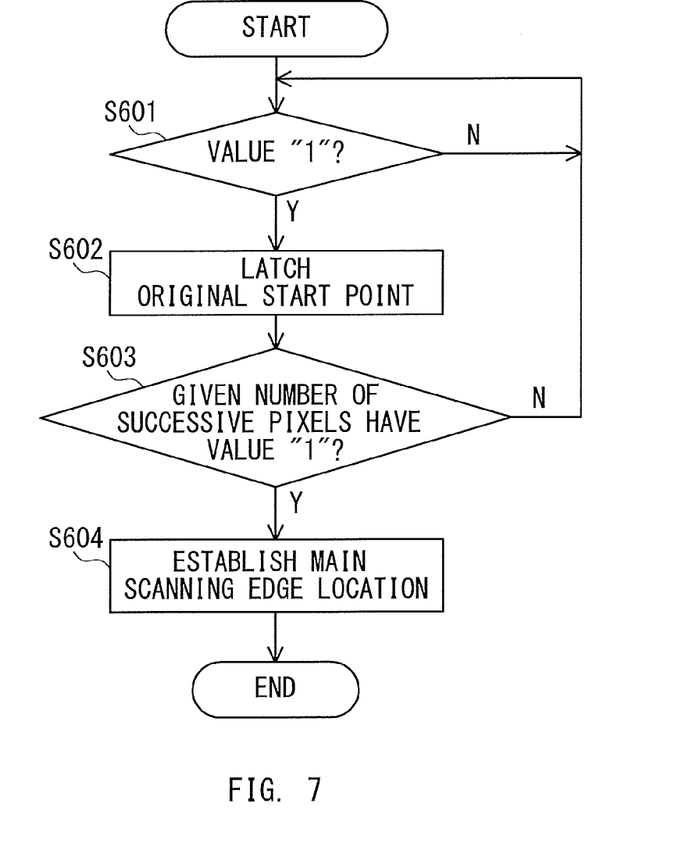
FIG. 7 is a flowchart for illustrating processing of obtaining an original start point in a main scanning direction.

The edge determining unit 408 obtains the edge information from the memory 407 and, as illustrated in FIG. 5D, obtains original start points at the left end and right end of the original image in the main scanning direction (Step S705). In other words, the end portions of the original image in the main scanning direction are detected. FIG. 7 is a flowchart for illustrating the processing of obtaining an original start point of an original image in the main scanning direction. The edge determining unit 408 obtains the edge information from the memory 407, and searches for original end portion start points of the original image as illustrated in FIG. 5D. To attain this, the edge determining unit 408 checks the edge information for pixels that have a value "1" (Step S601). When the check reveals that a pixel has a value "1" (Step S601: Y), the edge determining unit 408 latches this pixel as an original start point (Step S602). The edge determining unit 408 checks whether or not a given number of successive pixels have a value "1" (Step S603). In the case where the given number of successive pixels have a value "1" (Step S603: Y), the edge determining unit 408 establishes the pixel latched in Step S606 as an original end portion start point (Step S604). In the case where the checked pixel does not have a value "1" (Step S601: N), or in the case where the number of successive pixels that have a value "1" does not reach the given number (Step S603: N), the edge determining unit 408 checks the value of the next pixel (Step S601). The edge determining unit 408 executes Steps S601 to S604 from the left side and right side of the main scanning direction each, to thereby establish original end portion start points.

After the original start points at the left end and right end of the original image in the main scanning direction are obtained, the edge information obtaining unit 405 calculates the inclination amount from the digital image data, based on two points that form the front end portion of the original image 102 in the conveying direction, within a range between pixels determined as the original start points at the left end and the right end in the main scanning direction (Step S706). The edge information obtaining unit 405 transmits the calculated inclination amount to the CPU 401. The inclination corrector 409 obtains the inclination amount from the CPU 401 and performs inclination correction on the digital image data to generate image data (Step S707). The inclination corrector 409 outputs the generated image data (Step S708).

After the image data is output, the controller 400 determines whether or not the next original 102 is placed on the original tray 101 (Step S709). The original tray 101 includes, for example, a sensor configured to detect the original 102 that is placed on the tray. The result of the detection of this sensor enables the controller 400 to determine whether or not the next original 102 is placed on the original tray 101. In the case where the next original 102 is placed on the tray (Step S709: Y), the controller 400 starts conveying the next original 102 with the use of the original conveying motor 105, and repeats the image reading processing (Step S701). In the case where the next original 102 is not placed on the tray (Step S709: N), the controller 400 ends the image reading processing.

In the manner described above, the image reading apparatus of this embodiment corrects inclination by calculating the inclination amount within a space between two edge portions of an original image in the main scanning direction. This enables the image reading apparatus to properly extract edge portions of an original image from digital image data by reducing the adverse effect of a speck image that is caused by floating specks as well as a speck image that is caused by fixed specks. The image reading apparatus of this embodiment is therefore capable of recognizing edge portions of an original image with precision even in the presence of floating specks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-216641, filed Nov. 4, 2015 which is hereby incorporated by reference herein in its entirety.

What is claimed is:

1. An image reading apparatus, comprising:
a tray on which an original is to be placed;
a conveyor configured to convey the original placed on the tray;
a sensor configured to read an image of the original that is being conveyed by the conveyor and to output image data;
a controller configured to:
perform an edge detection process on each pixel in a plurality of lines near a front end of the original, and to obtain, for each pixel, a result of the edge detection process,
generate a logical addition of the results of the edge detection process for each point in a main scanning direction to obtain edge information which indicates whether or not an image of an edge portion is detected at the each point, the main scanning direction being orthogonal to a conveying direction in which the original is conveyed, and
detect, based on the edge information, a portion where a given number of successive edge portions are detected in the main scanning direction to determine an original end portion in the main scanning direction.

2. The image reading apparatus according to claim 1, wherein the controller is configured to obtain an edge portion at a left end of the original image based on a point where, through detection conducted from a leftward direction of the main scanning direction, the given number of successive edge portion images are detected, and to obtain an edge portion at a right end of the original image based on a point where, through detection conducted from a rightward direction of the main scanning direction, the given number of successive edge portion images are detected.

3. The image reading apparatus according to claim 1, wherein the controller is configured to obtain, as the edge portion, a point where an image at a head of the given number of successive edge portion images is located.

4. The image reading apparatus according to claim 1, wherein the controller is configured to detect the image of the edge portion from a given range of the original image.

5. The image reading apparatus according to claim 1, wherein the controller is configured to obtain the edge information that indicates, in a digitized form, whether or not an image of an edge portion is detected at the point.

6. The image reading apparatus according to claim 5, wherein the controller is configured to obtain the edge information by digitizing the detected image of the edge portion and performing, for each pixel in the main scanning direction, logical addition of the edge portion images in a sub-scanning direction.

7. The image reading apparatus according to claim 1, further comprising an output unit configured to notify an error when the controller is unsuccessful in detecting the image of the edge portion.

8. The image reading apparatus according to claim 1, further comprising an identification unit configured to identify an edge image to be used to calculate an amount of inclination of the original, based on the at least one end portion detected by the controller.

9. An image reading method, which is executed by an image reading apparatus, the image reading apparatus comprising:
a tray on which an original is to be placed;
a conveyor configured to convey the original placed on the tray;
a sensor configured to read an image of the original that is being conveyed by the conveyor and to output image data; and
a controller,
the method, which is executed by the controller, comprising:

performing detection process on each pixel in a plurality of lines near a front end of the original, and obtaining, for each pixel, a result of the edge detection process; and generating a logical addition of the results of the edge detection process for each point in a main scanning direction to obtain edge information which indicates whether or not an image of an edge portion is detected at the each point, the main scanning direction being orthogonal to a conveying direction in which the original is conveyed; and detecting, based on the edge information, a portion where a given number of successive edge portions are detected in the main scanning direction to determine an original end portion in the main scanning direction.

10. The image reading method according to claim 9, further comprising obtaining, by the controller, an edge portion at a left end of the original image based on a point where, through detection conducted from a leftward direction of the main scanning direction, the given number of successive edge portion images are detected, and obtaining an edge portion at a right end of the original image based on a point where, through detection conducted from a rightward direction of the main scanning direction, the given number of successive edge portion images are detected.

11. The image reading method according to claim 9, further comprising obtaining, by the controller, as the edge portion, a point where an image at a head of the given number of successive edge portion images is located.

12. The image reading method according to claim 9, further comprising detecting, by the controller, the image of the edge portion from a given range of the original image.

13. The image reading method according to claim 9, further comprising obtaining, by the controller, the edge information that indicates, in a digitized form, whether or not an image of an edge portion is detected at the point.

14. The image reading method according to claim 13, further comprising obtaining, by the controller, the edge information by digitizing the detected image of the edge portion and performing, for each pixel in the main scanning direction, logical addition of the edge portion images in a sub-scanning direction.

15. The image reading method according to claim 9, further comprising notifying, by the controller, an error through a given output unit when no image of the edge portion is detected.

16. The image reading method according to claim 9, further comprising identifying, by the controller, an edge image to be used to calculate an amount of inclination of the original, based on the detected at least one end portion.

* * * * *